United States Patent
Hamada et al.

[11] Patent Number: 5,943,512
[45] Date of Patent: Aug. 24, 1999

[54] APPARATUS EQUIPMENT WITH POSITION DETECTING DEVICE

[75] Inventors: Satoshi Hamada, Habikino; Akira Kosaka, Yao, both of Japan

[73] Assignee: Minolta Co., Ltd., Osaka, Japan

[21] Appl. No.: 08/978,269

[22] Filed: Nov. 25, 1997

[30] Foreign Application Priority Data

Nov. 26, 1996 [JP] Japan ................................. 8-315101

[51] Int. Cl.$^6$ ........................... G03B 17/00; G01B 11/14
[52] U.S. Cl. ............................................. 396/55; 356/375
[58] Field of Search .......................... 396/55; 359/554, 359/557; 250/206.1, 201.1; 348/208; 356/375, 373

[56] References Cited

U.S. PATENT DOCUMENTS 5,585,884  12/1996  Onuki ................................. 396/55 X

FOREIGN PATENT DOCUMENTS 04018515  1/1992  Japan .
04031820  2/1992  Japan .

Primary Examiner—W. B. Perkey
Attorney, Agent, or Firm—McDermott, Will & Emery

[57] ABSTRACT

A position detecting apparatus, which is used in a shake correctable camera for detecting positions of an optical axis of a shake correction lens, corrects an error component of a first position sensor for detecting the position of the optical axis in a first direction which is, for example, the vertical direction is corrected by adding a correction value which is selected from a one dimensional table corresponding to the position of the optical axis in the second direction which is for example, the horizontal direction.

25 Claims, 12 Drawing Sheets

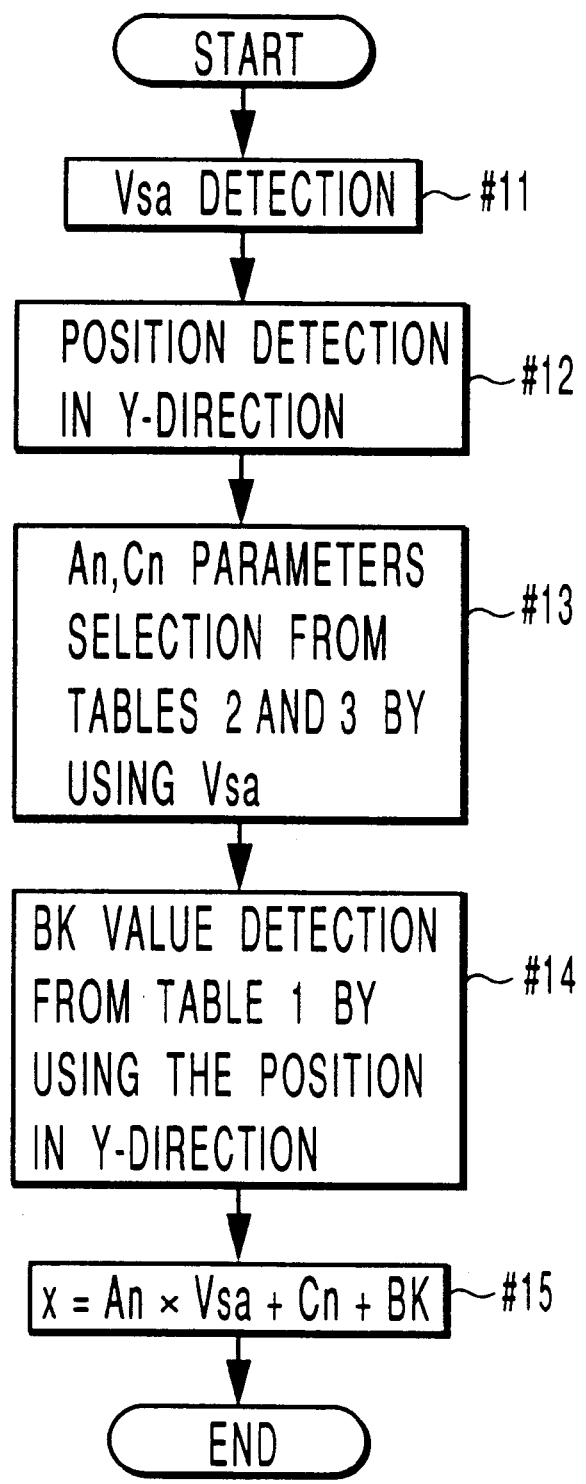

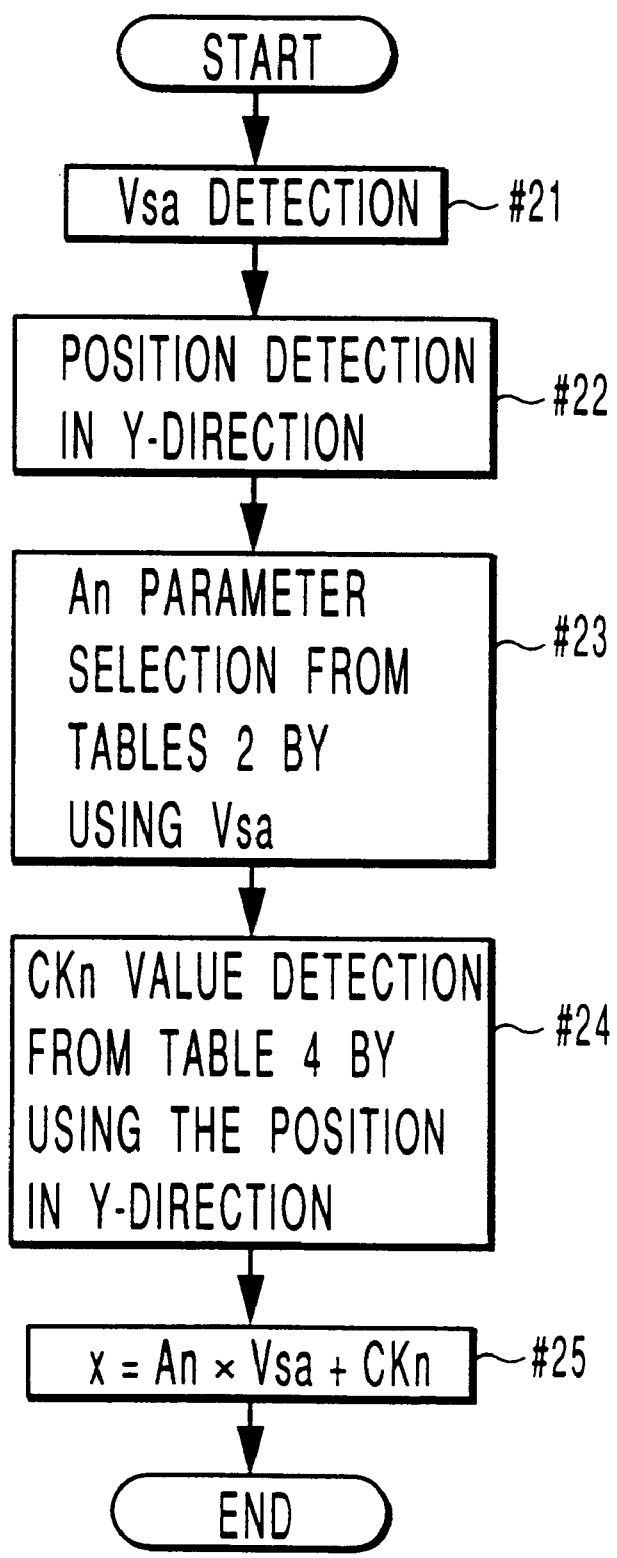

APPARATUS EQUIPMENT WITH POSITION DETECTING DEVICE

BACKGROUND OF THE INVENTION

1. Field of the Invention

The present invention relates to an apparatus having a position detecting apparatus used with a correction lens, for example, a camera having an optical shake correction apparatus in order to control a position of the correction lens thereby for reducing an influence of vibrations of relatively low frequency due to an unintentional hand movement called camera shake.

2. Description of the Related Art

This type of position detecting apparatus is described below by taking a camera having an optical shake correction device as an example.

In the camera, unintentional hand movement (camera shake) is detected by a vibration sensor detecting an angular acceleration, angular velocity and so on. The correction lens is moved corresponding to a value of sensing signal from the vibration sensor in order to cancel the movement of an optical axis of a taking lens of the camera. In such a camera, it is necessary to detect the position of the optical axis of the correction lens accurately in the movement of the correcting lens for accurately performing the above correction.

In a conventional position detecting device for an optical shake correction device, shown in the publication gazette of Japanese Unexamined Patent Application Hei 4-18515, an LED serving as a light emitting device and a PSD (Position sensitive light Detector) serving as light receiving device are respectively provided on a moving portion and a fixed portion. The center of a light beam spot emitted from the LED is detected by the PSD. Thus, the position of the moving portion is known.

FIG. 12A illustrates a structure of a conventional optical shake correction device. FIG. 12B illustrates a relation between a slit of a light emitting portion and a light receiving surface of a light receiving portion in a position detecting device of the mechanism when an axis designated by arrow Y is parallel with the slit. FIG. 12C illustrates another relation between the slit and the light receiving surface when the axis designated by arrow Y and the slit are deviated from the parallel state.

As can be seen from FIG. 12A, a correction lens group 61 is held at the center of a frame 62. A first position sensor 63 and a second position sensor 64 are provided on the frame 62 so as to cross at right angle. The first position sensor 63 detects a position of the correction lens group 61 in a direction shown by arrow X (hereinafter abbreviated as X-direction). The second position sensor 64 detects a position of the correction lens group 61 in a direction designated by arrow Y (hereinafter abbreviated as Y-direction). The frame 62 is moved a predetermined distance in X-direction by an X-direction driving mechanism (not shown in the figure) responding to an information detected by the first position sensor 63 in order to correct the displacement of an optical axis of a taking lens due to the camera shake in X-direction. Similarly, the frame 62 is moved a predetermined distance in Y-direction by a Y-direction driving mechanism 65 responding to an information detected by the second position sensor 64 in order to correct the displacement of an optical axis of a taking lens due to the camera shake in Y-direction.

A pair of an LED 66 serving as a light emitting device and a PSD 67 serving as a light receiving device is provided on respective of the first and second position sensors 63 and 64. Each LED 66 faces the PSD 67 through a slit 68. The light emitting portion consists of the LED 66 and the slit 68 is relatively movable against the PSD 67 serving as the light receiving portion. Thus, the positions of the correction lens group 61 in X-direction and Y-direction can be detected.

When the camera shake occurs, a vertical camera shake component is corrected by moving the correction lens group 61 in X-direction which is controlled by the position information from the first position sensor 63 and a horizontal camera shake component is corrected by moving the correction lens group 61 in Y-direction which is controlled by the position information from the second position sensor 64. Thus, the movement of the optical axis of the taking lens of the camera due to the camera shake is substantially canceled by the movement of the optical axis of the correction lens group, so that shake of an image focused on a focal plane of the camera is reduced.

However, in the above-mentioned conventional structure, the LED 66 is constituted so as to be movable in both of X-direction and Y-direction to the light receiving surface of the PSD 67. A moving component in a direction which is not in a position detecting direction (that is, Y-direction when the position sensing is performed in X-direction or X-direction when the position sensing is performed in Y-directional) causes a deviation in the center of the light beam spot emitted from the LED 66 and passing through the slit 68 on the light receiving surface of the PSD 67. The deviation further causes an error component of the position detection, so that it is difficult to detect the position of the correction lens group accurately.

As can be seen from FIG. 12B, when the position detection is performed along X-direction and the lengthwise direction of the slit 68 is parallel with Y-direction, the position of the center of the light beam spot on the light sensing surface of the PSD 67, which is emitted from the LED 66 and passing through the slit 68, may not deviate in X-direction, even though the LED 66 and the slit 68 move in Y-direction. However, the LED 66 and the slit 66 really move in both of X-direction and Y-direction. Furthermore, there are tolerances in each element. Thus, as can be seen from FIG. 12C, the lengthwise direction of the slit 68 slightly tilts from Y-direction. When the LED 66 and the slit 68 move in Y-direction, a deviation component A of the center of the light beam spot on the light receiving surface of the PSD 67, which is emitted from the LED 66 and passing through the slit 68, occurs in X-direction. The deviation component A causes the error component of the position detection and is included in the position detection of the correction lens group 61 in X-direction.

SUMMARY OF THE INVENTION

A purpose of the present invention is to provide an apparatus having a position detecting device capable of correcting or reducing an error component of position detection and performing position control of an object to be moved accurately.

An apparatus in accordance with one aspect of the present invention comprises: a first light emitting device and a first light receiving device provided relatively movable in a first direction, the first light emitting device emitting a light beam on a light receiving surface of the first light receiving device, and the first light receiving device outputting at least a signal corresponding to a position of the light beam; a second light emitting device and a second light receiving device provided relatively movable in a second direction, the second light emitting device emitting a light beam on a light receiving surface of the second light receiving device, and the second light receiving device outputting at least a signal corresponding to a position of the light beam; and a correction controller correcting an error component in a first result of position detection in the first direction by using a second result of a position detection in the second direction.

In the above-mentioned configuration, it is preferable that the correction controller should correct the error component in the first result by adding a correction vale to the first result of position detection, and select the correction value from a first one dimensional table corresponding to the second result of position detection.

Alternatively, it is preferable that the correction controller should select two parameters respectively from a second and a third one dimensional tables corresponding to the first result of position detection, and further correct the first position detection by using the two parameters for canceling an inherent error component of the first light receiving device.

Alternatively, it is preferable that the correction controller should select a parameter from a second one dimensional table corresponding to the first result of position detection and a correction value from a fourth two dimensional table corresponding to the first and second results of position detection for canceling inherent error components of the and second light receiving devices.

By the above-mentioned configurations, the error component of the first result of position detection in the first direction due to the movement of the moving object in the second direction can be corrected. When the first direction is assumed as a position detecting direction, the center of the light beam emitted from the first light emitting device moves on the light receiving surface of the first light receiving device. The position or displacement of the center of the light beam spot on the light receiving surface can be detected by using the output of the first light receiving device.

However, the first light emitting device relatively moves against the light receiving surface of the first light receiving device in both of the first and second directions. When the first light emitting device moves in the second direction in a tilted state, the movement of the first light emitting device generates a component in the first direction. As a result, the center of the light beam spot emitted from the first light emitting device on the light receiving surface of the first light receiving device in the first direction deviates from the primary position.

In order to correct the deviation of the center of the light beam spot in the first direction due to the movement of the first light emitting device in the second direction, an optimum correction value is selected corresponding to the position of the first light emitting device in the second direction. The position in the second direction is measured by the second position sensor.

The correction controller selects the correction value from the table corresponding to the position of the first light emitting device in the second direction for canceling the error of position detection in the first direction. Furthermore, the correction controller calculates a corrected position by adding the selected correction value to the actually detected position of the position of the center of the light beam on the light receiving surface of the first light receiving device in the first direction. The correction controller outputs the corrected position.

An apparatus according to another aspect of the present invention comprises: a first driving mechanism for moving a moving object to be moved in a first direction; a second driving mechanism for moving the moving object in a second direction; a first position sensor for detecting a position of the moving member in the first direction; a second position sensor for detecting a position of the moving member in the second direction; and an error corrector for correcting an error component of a first result of position detection in the first direction by the first position sensor based on a second result of position detection in the second direction by the second position sensor.

Another apparatus according to another aspect of the present invention comprises: a first driving mechanism for moving a moving object to be moved in a first direction; a second driving mechanism for moving the moving object in a second direction; a first position sensor for detecting a position of the moving member in the first direction; a second position sensor for detecting a position of the moving member in the second direction; and an error detector for detecting an error component of the first position sensor due to a movement of the moving object in the second direction.

In the above-mentioned configurations, it is possible that the error detector detects the error component of the first position sensor based on an output of the second position sensor.

Furthermore, it is preferable that the moving object be a lens held on a first moving frame which is movably held in the alternative of the first and second directions by a second moving frame, the second moving frame is movably held in the other direction by a fixed frame; the first position sensor comprises a first light emitting device and a first light receiving device provided relatively movable in a first direction, the first light emitting device emitting a light beam on a light receiving surface of the first light receiving device, and the first light receiving device outputting at least a signal corresponding to a position of the light beam; the second position sensor a second light emitting device and a second light receiving device provided relatively movable in a second direction, the second light emitting device emitting a light beam on a light receiving surface of the second light receiving device, and the second light receiving device outputting at least a signal corresponding to a position of the light beam; the alternative of the first light emitting device and the first light receiving device and the alternative of the second light emitting device and the second light receiving device are provided on the first moving frame and the others are provided on the fixed frame; and the alternative of the first moving frame and the fixed frame comprises slits for narrowing light beams emitted from the first and second light emitting devices.

Furthermore, it is preferable that the second position sensor should detect a deviation of a center of the light beam emitted from the first light emitting device and passing through the slit on the light receiving surface of the first light receiving device due to a movement of the first light emitting device in the second direction; and the error corrector corrects the first result of position detection based on the deviation.

By the above-mentioned configuration, the positions of the moving object detected by the first and second position sensors are preferable corrected for reducing the error component in the position detection. Thus, the moving object is precisely positioned by the position control apparatus.

An apparatus according to another aspect of the present invention comprises: a first driving mechanism for moving a shake correction lens in a first direction; a second driving mechanism for moving the shake correction lens in a second direction; a first position sensor for detecting a position of the shake correction lens in the first direction; a second position sensor for detecting a position of the shake correction lens in the second direction; an error corrector for correcting an error component of a first result of position detection in the first direction by the first position sensor based on a second result of position detection in the second direction by the second position sensor; and a controller for controlling the first driving mechanism based on the corrected first result of position detection by the error corrector.

Another apparatus according to another aspect of the present invention comprises: a first driving mechanism for moving a shake correction lens in a first direction; a second driving mechanism for moving the shake correction lens in a second direction; a first position sensor for detecting a position of the shake correction lens in the first direction; a second position sensor for detecting a position of the shake correction lens in the second direction; an error detector for detecting an error component of the first position sensor due to a movement of the moving object in the second direction; an error corrector for correcting the error component of the first position sensor detected by the error detector; and a controller for controlling the first driving mechanism based on the corrected first result of position detection by the error corrector.

In the above-mentioned configuration, it is preferable that the second position sensor should detect a deviation of a center of the light beam emitted from the first light emitting device and passing through the slit on the light receiving surface of the first light receiving device due to a movement of the first light emitting device in the second direction; and the error corrector correct the first result of position detection based on the deviation.

Furthermore, it is preferable that the shake correction lens be held on a first moving frame which is movably held in the alternative of the first and second directions by a second moving frame, the second moving frame be movably held in the other direction by a fixed frame; the first position sensor should comprise a first light emitting device and a first light receiving device provided relatively movable in a first direction, the first light emitting device emitting a light beam on a light receiving surface of the first light receiving device, and the first light receiving device outputting at least a signal corresponding to a position of the light beam; the second position sensor comprise a second light emitting device and a second light receiving device provided relatively movable in a second direction, the second light emitting device emitting a light beam on a light receiving surface of the second light receiving device, and the second light receiving device outputting at least a signal corresponding to a position of the light beam; the alternative of the first light emitting device and the first light receiving device and the alternative of the second light emitting device and the second light receiving device are provided on the first moving frame and the others are provided on the fixed frame; and the alternative of the first moving frame and the fixed frame comprise slits for narrowing light beams emitted from the first and second light emitting devices.

Furthermore, it is preferable that the second position sensor should detect a deviation of a center of the light beam emitted from the first light emitting device and passing through the slit on the light receiving surface of the first light receiving device due to a movement of the first light emitting device in the second direction; and the error corrector correct the first result of position detection based on the deviation.

Furthermore, it is preferable that the apparatus is a camera.

These and other objects, features and advantages of the present invention will become more apparent upon a reading of the following detailed description and accompanying drawings.

BRIEF DESCRIPTION OF THE DRAWINGS

FIG. 10 is a flow chart showing operations of a correction of position detection in an apparatus of a second embodiment;

FIG. 11 is a flow chart showing operations of a correction of position detecting in an apparatus of a third embodiment.

DETAILED DESCRIPTION OF THE PREFERRED EMBODIMENTS OF THE INVENTION

First Embodiment

A first embodiment of the present invention is described with reference to the drawings. This embodiment relates to a camera embodied the present invention.

Figure 1:
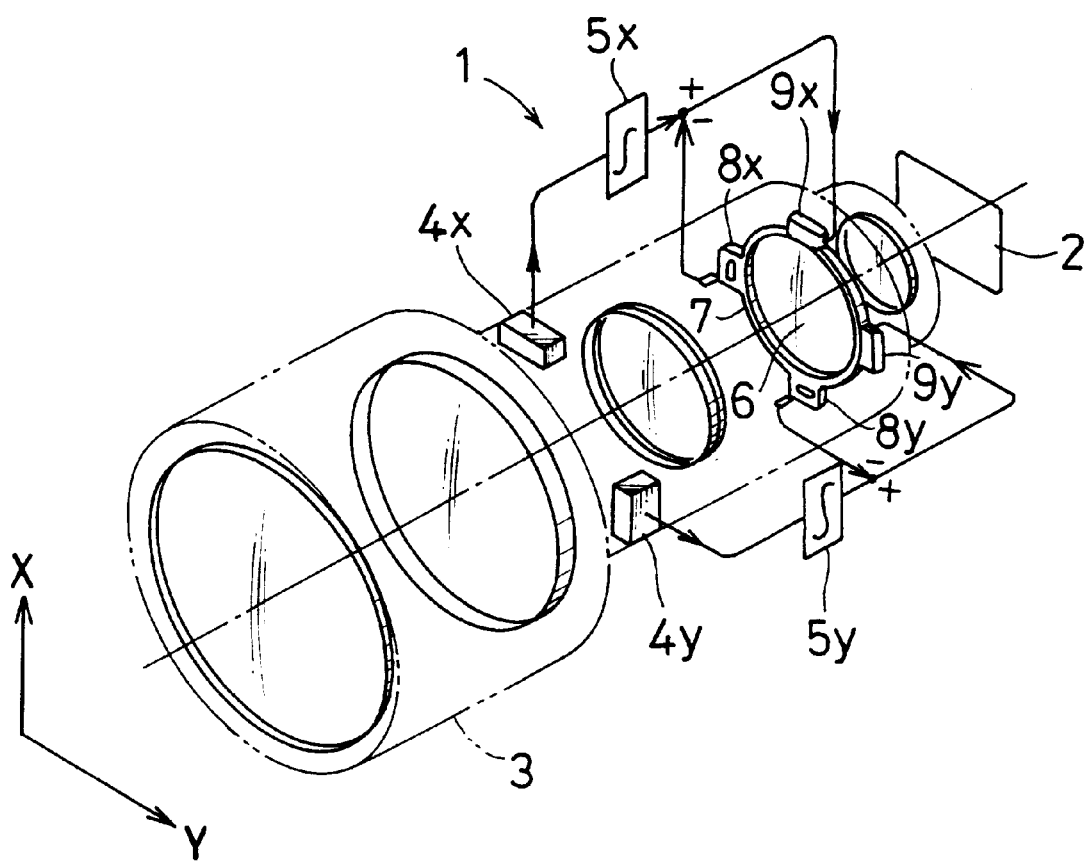
FIG. 1 is a perspective view showing a structure of an essential portion of a camera which is a first embodiment of the present invention.

As can be seen from FIG. 1, an image shake correction device 1, which corrects an image shake (or movement) on an image plane 2 due to vertical and horizontal unintentional camera shakes, is provided in a lens barrel 3 of a camera. The image shake correction device 1 comprises a first accelerometer 4$x$ and a second accelerometer 4$y$. The first accelerometer 4$x$ detects the angular acceleration of an unintentional camera shake in a first direction which is, for example, the vertical direction designated by arrow X (hereinafter abbreviated as X-direction). The second accelerometer 4$y$ detects the angular acceleration of an unintentional camera shake in a second direction which is, for example, the horizontal direction designated by arrow Y (hereinafter abbreviated as Y-direction).

A first integrator 5x is connected to the first accelerometer 4x to integrate an output signal of the first accelerometer 4x and to convert it into an angular displacement data of hand shake in X-direction. A second integrator 5y is connected to the second accelerometer 4y to integrate an output of the second accelerometer 4y and to convert it into an angular displacement data of hand shake in Y-direction. A first position sensor 8x detects a position or displacement of a frame 7 in X-direction. A second position sensor 8y detects a position or displacement of the frame 7 in Y-direction. The frame 7 holds a correction lens group 6. A first driving mechanism 9x moves the frame 7 in X-direction responding to signals from the first integrator 5x and the first position sensor 8x so as to reduce the influence in the image due to the camera shake, or the like on the image plane 2 in X-direction. A second driving mechanism 9y moves the frame 7 in Y-direction responding to signals from the second integrator 5y and the second position sensor 8y so as to reduce the influence in the image due to the camera shake, or the like on the image plane 2 in Y-direction.

Thus, even though an unintentional camera shake occurs in taking a picture, it is possible to correct or cancel the unintentional image shake by moving an optical axis of the correction lens group 6 which is held on the frame 7 in X-direction and in Y-direction.

The correction lens group 6, the frame 7, the first and second position sensors 8x and 8y, and the first and second driving mechanisms 9x and 9y configure an optical shake correction device.

Figure 2:
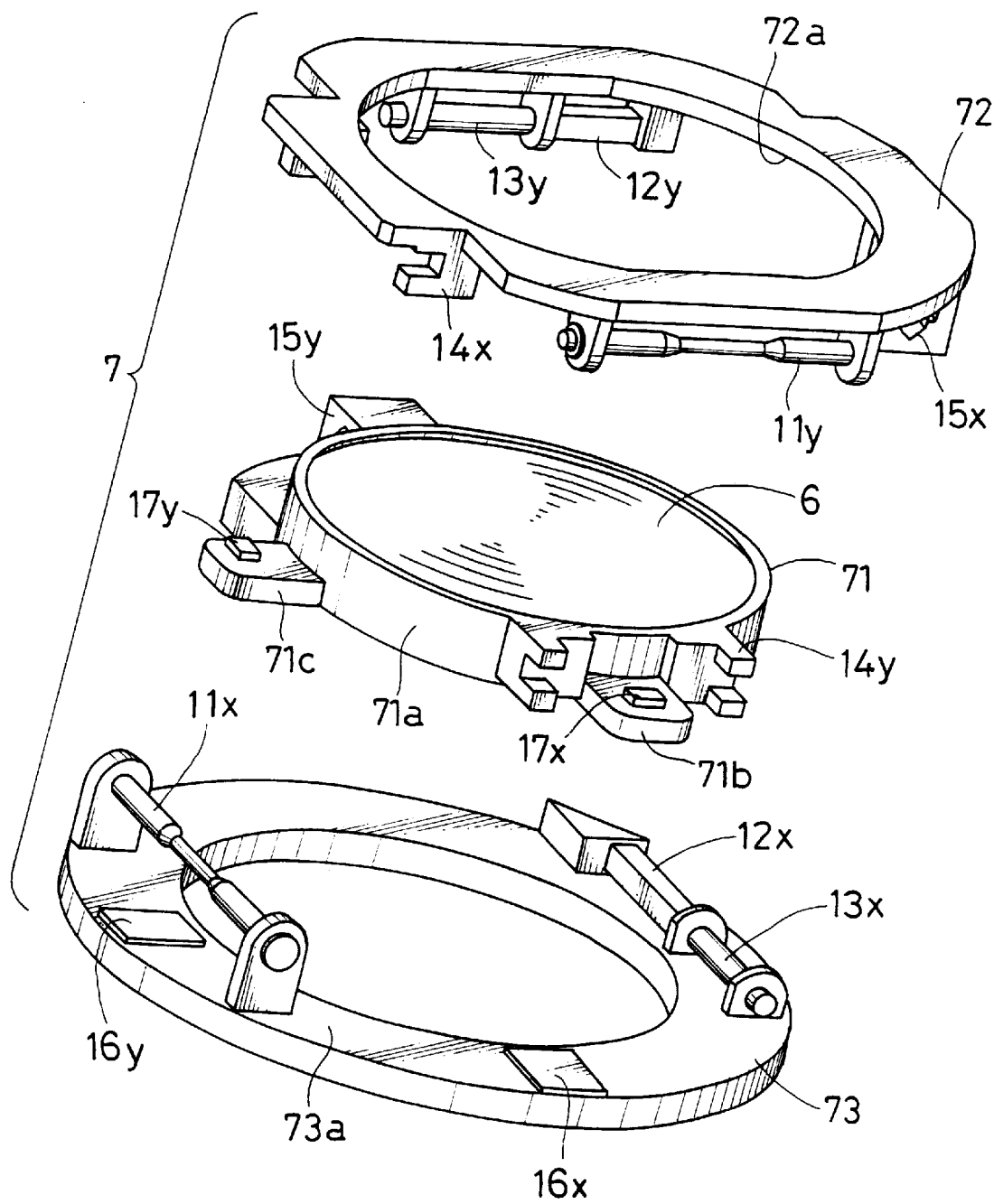
FIG. 2 is an exploded perspective view of the first embodiment of the optical sensor used in an optical shake correction apparatus.

As can be seen from FIG. 2, the frame 7 for holding the correction lens 6 comprises a first moving frame 71, a second moving frame 72 and a fixed frame 73. The first moving frame 71, which directly holds the correction lens group 6, is engaged with the second moving frame 72 in a manner to be movable, for example, in Y-direction. The second moving frame 72 is engaged with the fixed frame 73 in a manner to be movable, for example, in X-direction. Thus, the first moving frame 71 with the correction lens group 6 is relatively movable in both of X-direction and Y-direction against the fixed frame 73.

On a first surface 73a of the fixed frame 73 facing the first moving frame 71, a first shaft 11x is supported in parallel with X-direction. A first piezoelectric device 12x and a first rod 13x are provided in parallel with the first shaft 11x at a position opposite to the first shaft 11x on the first surface 73a against the center of the fixed frame 73.

On a second surface 72a of the second moving frame 72 facing the first moving frame 71, a pair of first engaging hooks 14x, which movably engages with the first shaft 11x, are provided. A first driven member 15x, which frictionally engages with the first rod 13x, is provided in parallel with an arranging direction of the first engaging hooks 14x at a position opposite to the first engaging hooks 14x on the second surface 72a against the center of the second moving frame 72. When the second moving frame 72 is movably engaged with the fixed frame 73 along the first shaft 11x and the first rod 13x, the second moving frame 72 is moved in X-direction by a driving force of the first piezoelectric device 12x.

Furthermore, on the second surface 72a of the second moving frame 72, a second shaft 11y is supported in parallel with Y-direction. A second piezoelectric device 12y and a second rod 13y are provided in parallel with the second shaft 11y at a position opposite to the second shaft 11y on the second surface 72a against the center of the second frame 72.

On an outer surface 71a of the first moving frame 71, a pair of second engaging hooks 14y, which movably engages the second shaft 11y, is provided. Furthermore, a second driven member 15y, which frictionally engages with the second rod 13y, is provided in parallel with an arranging direction of the second engaging hooks 14y at a position opposite to the second engaging hooks 14y against the center of the first moving frame 71. When the first moving frame 71 is movably engaged with the second moving frame 72 along the second shaft 11y and the second rod 13y, the first moving frame 71 is moved in Y-direction by a driving force of the second piezoelectric device 12y.

The piezoelectric devices 12x and 12y respectively serve as actuators by changing the length thereof corresponding to an applied voltage.

Furthermore, a first PSD 16x and a second PSD 16y are respectively provided on the first surface 73a of the fixed frame 73. On the other hand, on a first deck 71b protruded from the outer surface 71a of the first moving frame 71, a first light emitting device 17x is provided in a manner to face the first PSD 16x at an initial state when the optical shake correction apparatus is assembled. Similarly, on a second deck 71c protruded from the outer surface 71a of the first moving frame 71, a second light emitting device 17y is provided in a manner to face the second PSD 16y at the initial state. The first light emitting device 17x and the first PSD 16x configures a first position sensor 8x for detecting the position of the first moving frame 71 against the fixed frame 73 in X-direction. The second light emitting device 17y and the second PSD 16y configures a second position sensor 8y for detecting the position of the first moving frame 71 against the fixed frame 73 in Y-direction. Thus, the positions or displacements of an optical axis of the correction lens group 6 fixed on the frame 7 in X-direction and in Y-direction can be detected. In other words, the frame 7 (including the first moving frame 71, the second moving frame 72, and the fixed frame 73), the first and second piezoelectric devices 12x and 12y, the first and second position sensors 8x and 8y configure a position control device for controlling the position of the object to be moved such as the correction lens group 6. Thus, the optical axis of the correction lens group 6 can be controlled by such position control device for correcting the camera shake.

Figure 3:
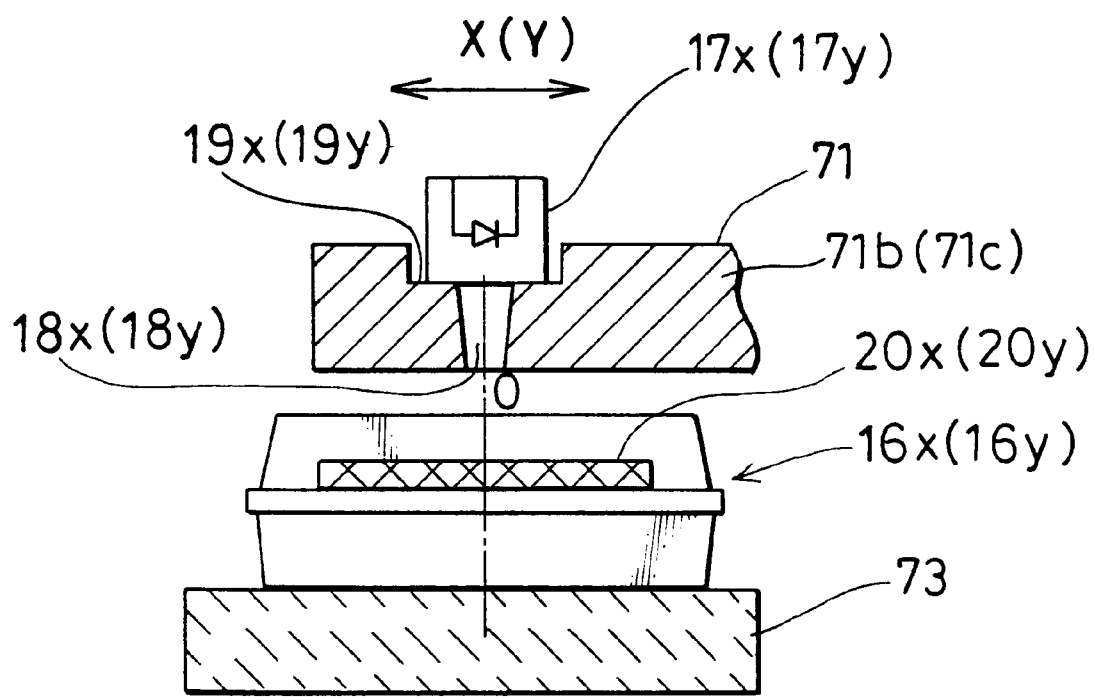
FIG. 3 is a cross-sectional view showing a structure of the first embodiment.

A cross-sectional structure of the first or second position sensor 8x or 8y is described with reference to FIG. 3. As can be seen from FIG. 3, a first concave portion 19x is formed on the first deck 71b and a second concave portion 19y is formed on the second deck 71c of the first moving frame 71. Furthermore, a first slit 18x and a second slit 18y are respectively formed on the first and second concave portions 19x and 19y. The first and second light emitting devices 17x and 17y are respectively disposed on the first and second concave portions 19x and 19y in a manner so that light emitting surfaces of the first and second light emitting devices 17x and 17y respectively face the first and second slits 18x and 18y. The first and second PSDs 16x and 16y on the fixed frame 73 are respectively disposed in a manner so that centers of light receiving surfaces 20x and 20y of the first and second PSDs 16x and 16y coincide with the centers O of the first and second slits 18x and 18y at the initial state.

The first and second slits 18x and 18y respectively serve as optical stops for cutting light beams emitted from the first and second light emitting devices 17x and 17y. If the first and second slits 18x and 18y are not formed, the light beams emitted from the first and second light emitting devices 17x and 17y will scatter. As a result, accuracy of the position detection will be reduced and the width of the region where the position or displacement of the light beam spot can be detected will become narrower.

Figure 4A:
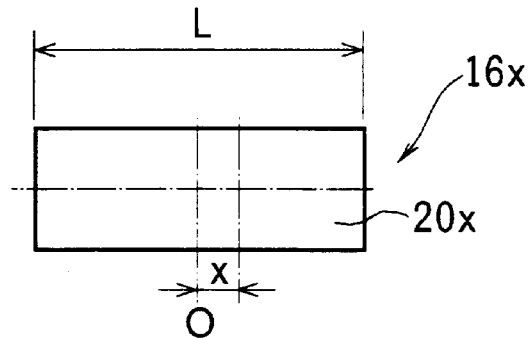
FIG. 4A is a top view of a light receiving surface of a PSD.
Figure 4B:
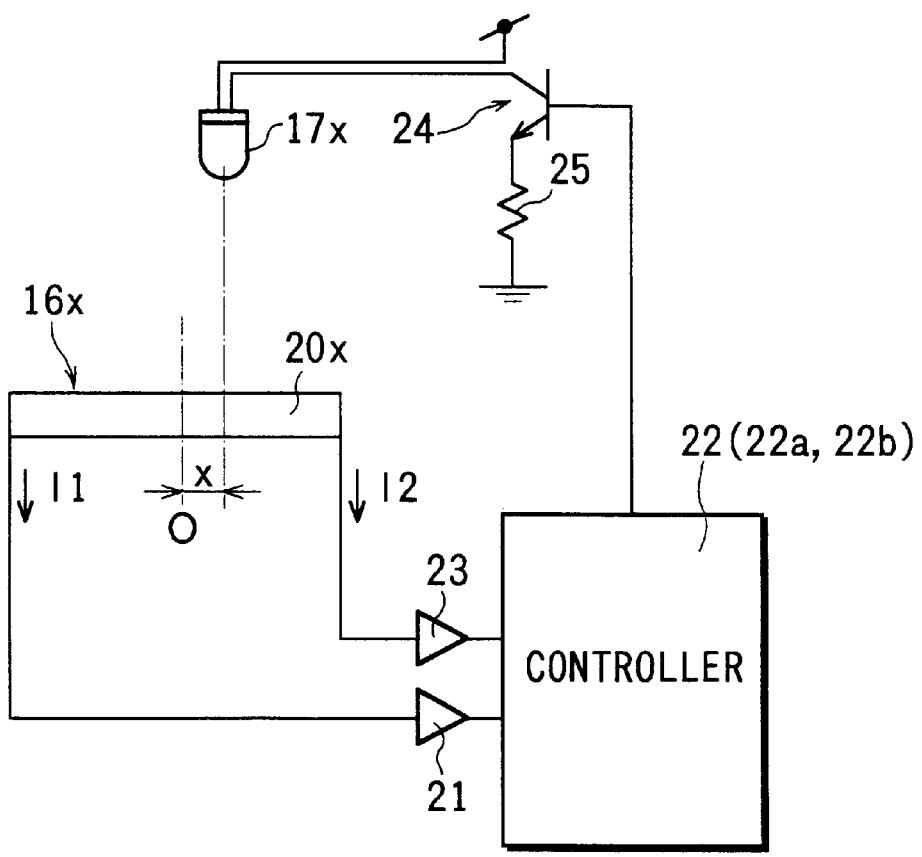
FIG. 4B is a circuit block diagram showing a position detection controller using the PSD shown in FIG. 4A.

Initial positions of the first and second light emitting devices 17x and 17y respectively face the centers O of the light receiving surfaces 20x and 20y of the first and second PSDs 16x and 16y. Thus, the light beam spots emitted from the first and second light emitting devices 17x and 17y respectively irradiate regions in the vicinity of the centers O. As mentioned above, the first and second light emitting devices 17x and 17y are relatively movable against the light receiving surfaces 20x and 20y of the first and second PSDs 16x and 16y in X-direction and in Y-direction. As can be seen from FIGS. 4A and 4b, when the center of the light beam spot emitted from the first light emitting device 17x moves by a displacement x from the center O of the light receiving surface 20x of the first PSD 16x, the first PSD 16x outputs two currents I1 and I2 from both out put terminals. Values of the currents I1 and I2 respectively correspond to the displacement x from the center O to the center of the light beam spot emitted from the first light emitting device 17x.

An output terminal of the first PSD 16x is connected to an amplifier 21 which serves as a current-voltage converter, and an output terminal of the amplifier 21 is connected to an input terminal of a controller 22 which comprises a microprocessor, a memory, and so on. The other output terminal of the first PSD 16x is connected to another amplifier 23 which also serves as a current-voltage converter, and an output terminal of the amplifier 23 is connected to another input terminal of the controller 22. The amplifier 21 converts the current I1 into a voltage V1 and the amplifier 23 converts the current I2 into a voltage V2. The voltages V1 and V2 are applied to the controller 22.

An output terminal of the controller 22 is connected to the base of a transistor 24, the collector of it is connected to one terminal of the first light emitting device 17x, and the emitter of it is grounded through a current-limiting resistor 25. The other terminal of the first light emitting device 17x is connected to a power supply line. The controller 22 controls the quantity of light to be emitted from the first light emitting device 17x by controlling the transistor 24 and measures the input voltages V1 and V2 to calculate the displacement x using the measurement result.

When the position of the light beam spot emitted from the first light emitting device 17x moves by the displacement x from the center of the light receiving surface 20x of the first PSD 16x in X-direction, the values of the currents I1 and I2 change responding to the displacement x. Thus, the displacement x can be calculated by detecting the changes of the voltages V1 and V2 proportional to the currents I1 and I2 by the controller 22.

With respect to the second light emitting device 17y and the second PSD 16y, they have substantially the same configuration as the above-mentioned configuration of the first light emitting device 17x and the first PSD 16x.

Calculation of the displacement x by the controller 22 is described below. When the center of the light beam spot emitted from the first light emitting device 17x positions at the center O of the light receiving surface 20x of the first PSD 16x, the value of the current I1 is equal to that of the current I2.

Then, when the center of the light beam spot moves by, for example, a displacement x2 from the center O of the light receiving surface 20x of the first PSD 16x, a relation of the following equation (1) is effected.

$$(2 \times x1)/L = (I1 - I2)/(I1 + I2) \tag{1}$$

In this case, L denotes the overall length of the light receiving surface 20x of the first PSD 16x in X-axis direction.

Moreover, by setting Vsa=V1−V2 and Vwa=V1+V2, the equation (1) is shown as the following equation (2).

$$x1 = (L/2) \times (Vsa/Vwa) \tag{2}$$

In the case of the equation (2), when controlling the quantity of the light emitted from the first light emitting device 17x by controlling the current flowing through the first light emitting device 17x via the transistor 24 so that Vwa=V1+V2=A becomes always constant, the equation (2) is shown as the following equation (3), since L is a constant.

$$x1 = A \times Vsa \tag{3}$$

Thus, the displacement x1 from the center O is proportional to Vsa=V1-V2 and they have a linear relation each other. In this case, A=(L/2)×(1/Vwa).

Accordingly, when the center of the light beam spot emitted from the first light emitting device 17x moves by the displacement x1 from the center O of the light receiving surface 20x of the first PSD 16x in X-direction, the controller 22 calculates the displacement x1 by controlling the quantity of the light emitted from the first light emitting device 17x so that it becomes Vwa=V1+V2=A (constant).

Figure 5:
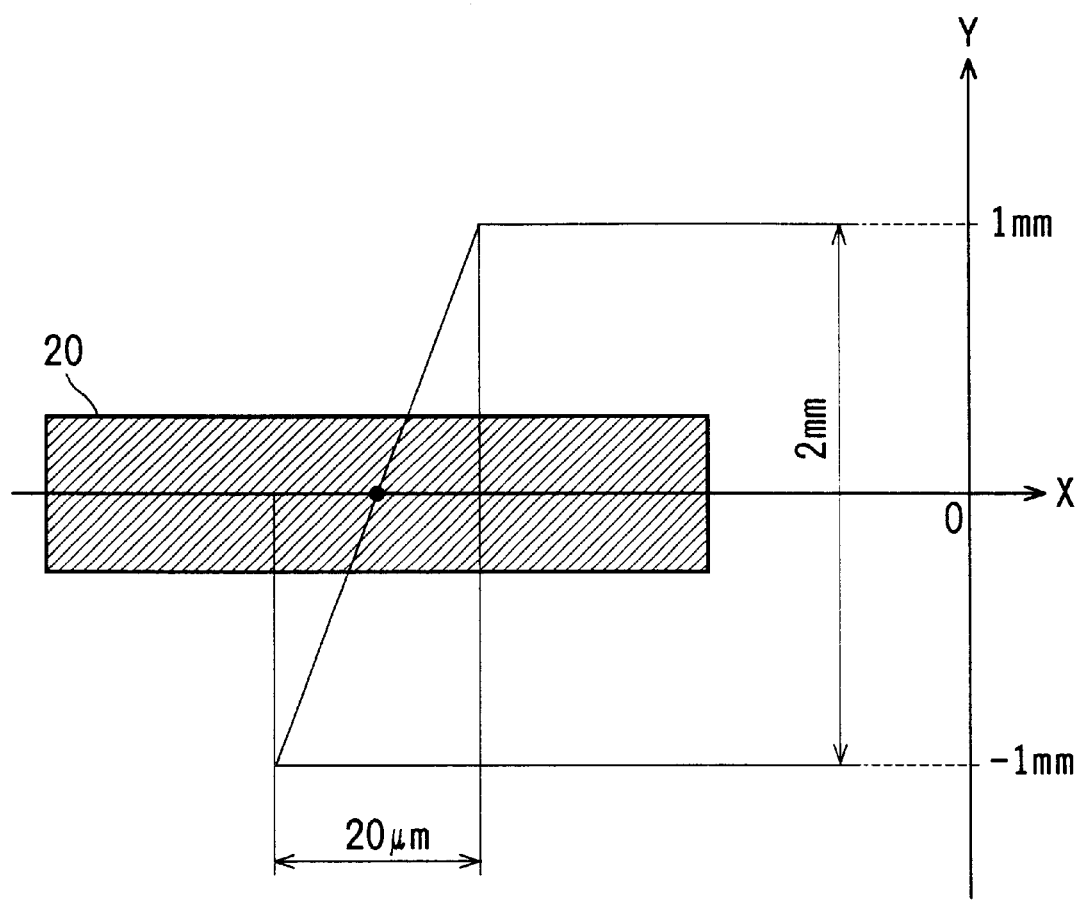
FIG. 5 is an illustration for explaining a correction of an error of position detection due to a tilt of a slit.

Correction of an error of position detection due to a tilt of the first slit 18x is described with reference to FIG. 5. As can be seen from FIG. 5, when X-direction is assumed as a position detecting direction, the first light emitting device 17x and the first slit 18x move in X-direction. Thus, the center of the light beam spot emitted from the first light emitting device 17x moves on the light receiving surface 20x of the first PSD 16x. By using the circuit structure shown in FIG. 4B, the position of the center of the light beam spot on the light receiving surface 20x of the first PSD 16x can be detected.

Figure 12B:
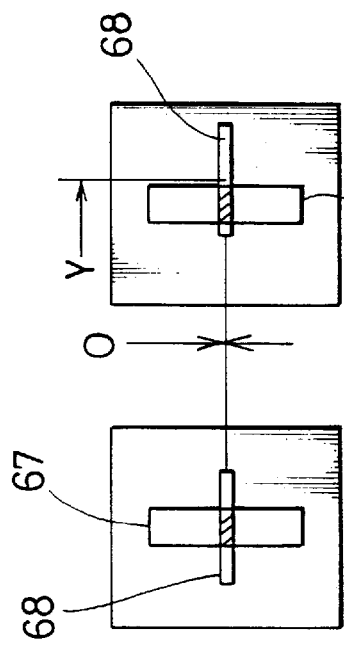
FIG. 12B is the plan view showing the relations between the slit and the light receiving surface of the PSD when the slit is parallel with Y-direction.
Figure 12C:
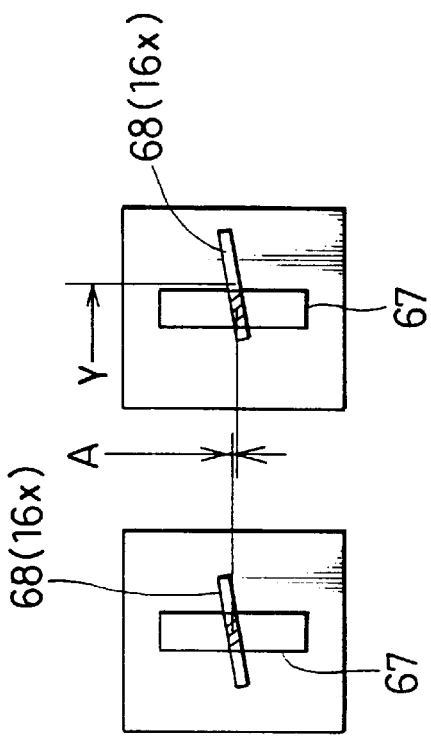
FIG. 12C is the plan view showing the relations between the slit and the light receiving surface of the PSD when the slit is deviated from the parallel state with Y-direction.
Figure 12A:
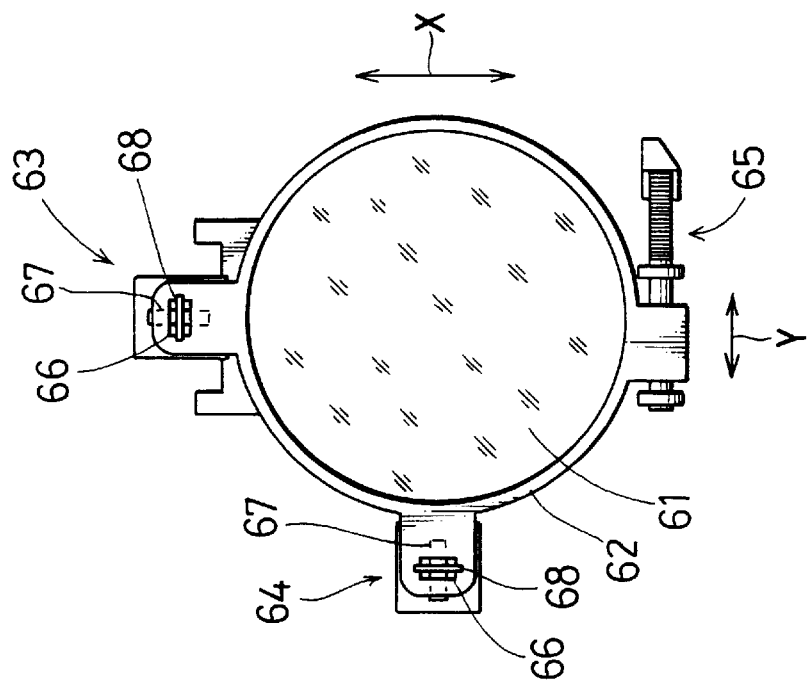
FIG. 12A is the front view showing the structure of the conventional optical correction mechanism.

As mentioned above, the first light emitting device 17x and the first slit 18x are relatively movable against the light receiving surface 20x of the first PSD 16x in both of X-direction and in y-direction. However, as shown in FIG. 12C, the lengthwise direction of the first slit 18x deviates from the parallel state with Y-direction due to the tolerance of the first slit 18x and so on. When the first light emitting device 17x and the first slit 18x move in Y-direction under the above-mentioned deviated state, a crossing point of the first slit 18x and the light receiving surface 20x of the first light receiving device 16x moves in X-direction. As a result, the center of the light beam spot emitted from the first light emitting device 17x and passing through the first slit 18x on the light receiving surface 20x of the first PSD 16x in X-direction deviates from the primary position. As shown in FIG. 5, when the first light emitting device 17x and the first slit 18x move by 2 mm in Y-direction, the center of the light beam spot moves about 20 μm in X-direction. Such the movement of the center of the light beam spot in X-direction causes the error of position detection in X-direction.

In order to correct the deviation of the center of the light beam spot in X-direction due to the movement of the first light emitting device 17x and the first slit 18x in Y-direction, the above equation (3) is arranged as following equation (4). An optimum correction value BK is selected corresponding to the displacement Y of the first light emitting device 17x and the first slit 18x in Y-direction. The displacement Y is measured by the second position sensor 8y including the second light emitting device 17y, the second slit 18y and the second PSD 16y by substantially the same way as that of the above-mentioned way.

$$x2 = A \times Vsa + BK \qquad (4)$$

It is possible to set a one-dimensional table 1 having a displacement Y in Y-direction as a parameter as follows.

TABLE 1

BK value table

| Displacement Y | Y>0.5 [mm] | 0.5 ≧Y≧−0.5 | −0.5>Y |
|---|---|---|---|
| BK | 5 [μm] | 0 | −5 [μm] |

The controller 22 selects the correction value BK from the above-mentioned table 1 corresponding to the displacement Y of the first light emitting device 17x and the first slit 18x in Y-direction for canceling the error of position detection in X-direction. Furthermore, the controller 22 calculates a corrected distance x2 by adding the selected correction value BK to the actually detected distance x1 of the position of the center of the light beam spot on the light receiving surface 20x of the first PSD 16x in X-direction. The controller 22 outputs the corrected distance x2 as the corrected position.

Hereupon, the displacement Y in Y-direction includes an error component due to the movement of the second light emitting device 17y and the second slit 18y in X-direction. However, since the error component is too smaller than the threshold value 0.5 mm in the table 1 to influence the error of position detection in Y-direction.

Operations of the first embodiment is described with reference to the flow chart shown in FIG. 6.

Figure 6:
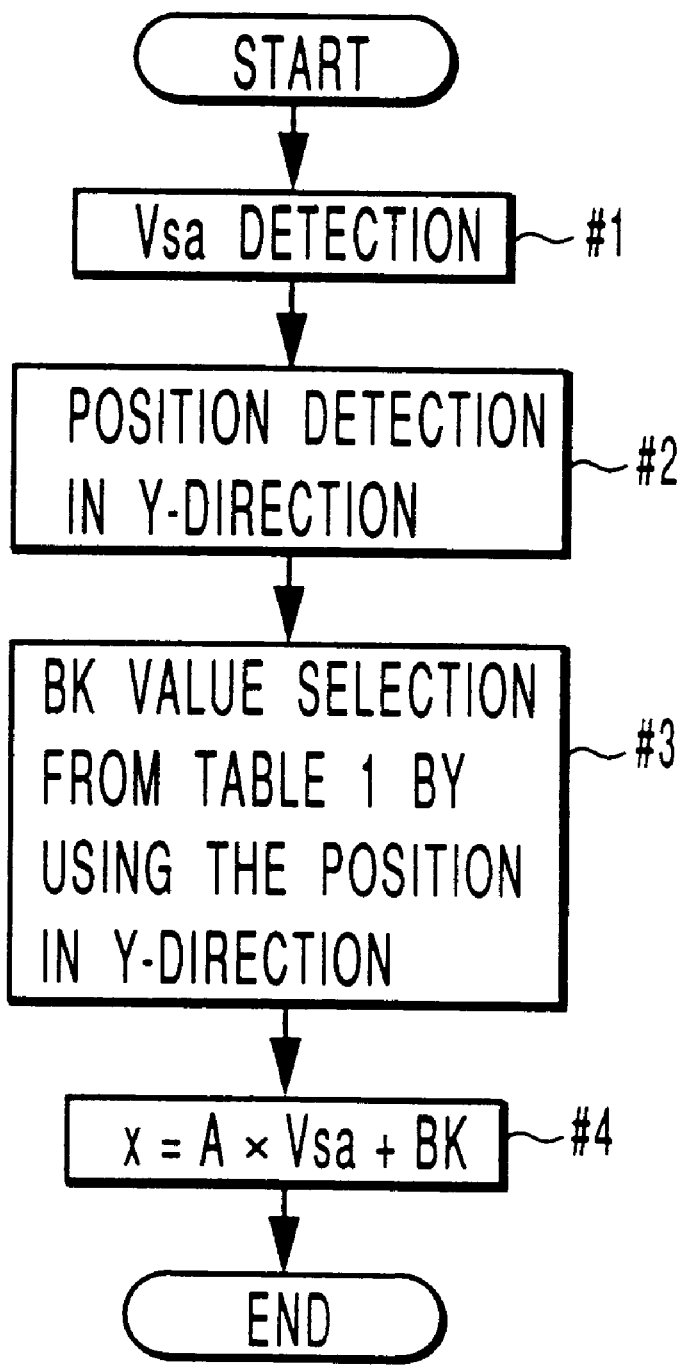
FIG. 6 is a flow chart showing operations of a correction of position detection in the first embodiment.

As can be seen from FIG. 6, in step #1, the controller 22 measures the input voltages V1 and V2 which correspond to the position of the light beam spot emitted from the first light emitting device 17x on the light receiving surface 20x of the first PSD 16x and calculates Vsa(=V1-V2) using the input voltages V1 and V2. Furthermore, the controller 22 calculates the displacement x1 in accordance with the equation (3). In step #2, the controller 22 detects the displacement Y of the center of the light beam spot emitted from the second light emitting device 17y on the light receiving surface 20y of the second PSD 16y in Y-direction by substantially the same way as that in the above-mentioned step #1. In step #3, the controller 22 selects the correction value BK from the table 1 using the displacement Y in Y-direction. In step #4, the controller 22 calculates the corrected displacement x2 including the optimum correction value BK in accordance with the equation (4).

Figure 7:
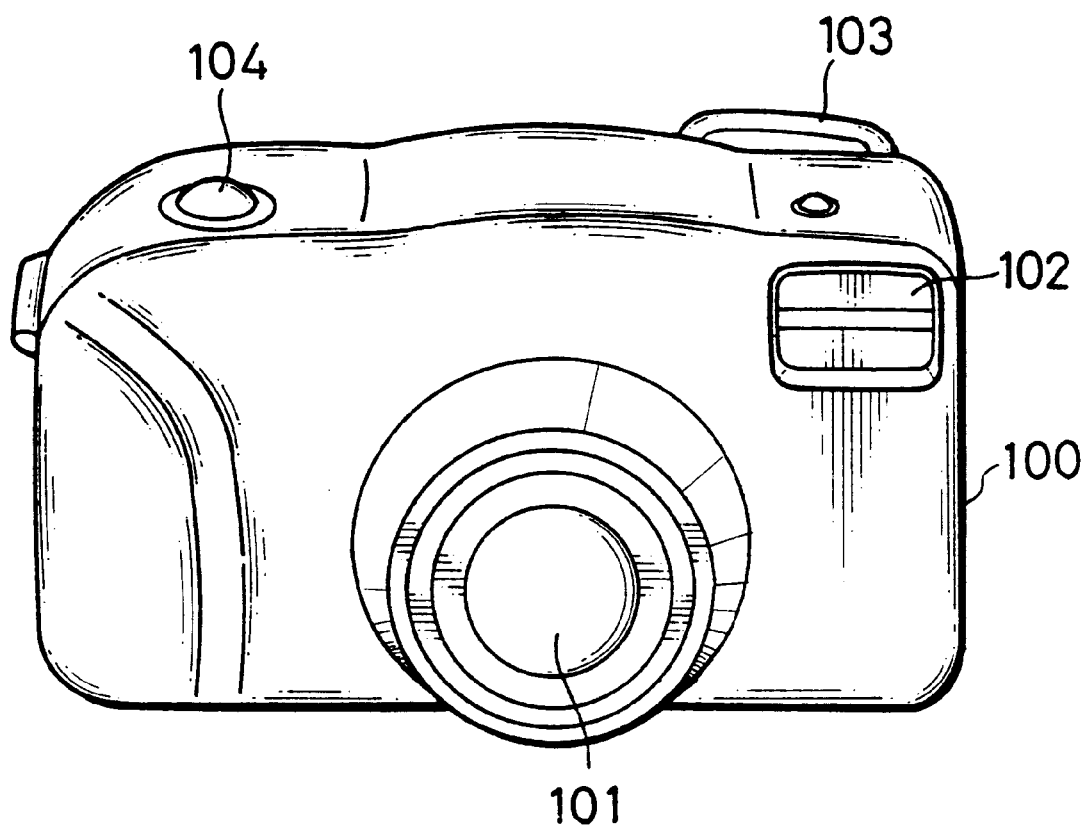
FIG. 7 is a perspective view showing the external configuration of the camera of the first embodiment.

The external appearance and the control of the camera with the above-mentioned shake correction device is described. The camera shown in FIG. 7 is provided with a shake correction function so that photographing can be performed while correcting a shake of a photographed image due to a camera shake. A block diagram of control portion of the camera is shown in FIG. 8.

Figure 8:
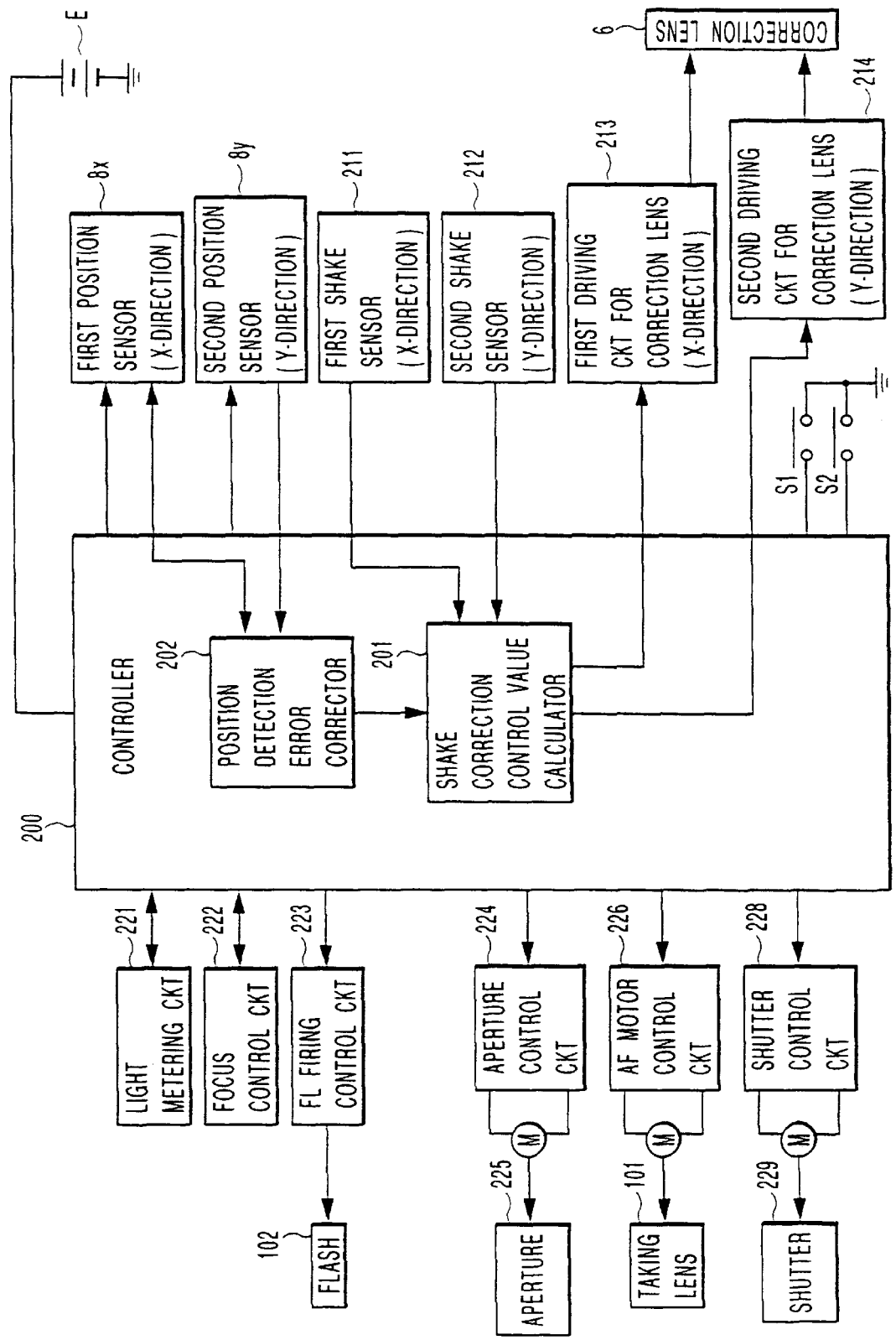
FIG. 8 is a block diagram showing a structure of a control portion of the camera of the first embodiment.

As can be seen from FIG. 7, the camera 100 comprises a taking lens 101, the above-mentioned shake correction device (see FIG. 1), a shutter mechanism (not shown in the figure) disposed, for example, in front of the focal plane of the taking lens 101, a flash lamp 102 for irradiating a flash light, a view finder 103 through which a user finds an image of an object through the taking lens 101, a shutter release button 104, and a control portion including a controller 200 and so on (see FIG. 8).

As can be seen from FIG. 8, the controller 200 is a microcomputer for centrally controlling a series of photographing operations of the camera 100 including the focusing control of the taking lens 101, exposure control and shake correction. The controller 200 comprises a shake correction control value calculator 201 for calculating drive control values of a shake correction lens 6 for correcting the shake in X-direction and in Y-direction. The controller 200 is further comprises a position detection error corrector 202 for correcting the above-mentioned error in the detected position or displacement of the optical axis of the correction lens group 6.

A first shake sensor 211 detects an amount of camera shake in X-direction and a second shake sensor 212 detects an amount of camera shake in Y-direction during a photographing preparation where the shutter release button 104 is partly pressed. Output signals of the first and second shake sensors 211 and 212 are respectively entered into the controller 200.

The amounts of camera shake in both of X-direction and Y-direction are inputted during the exposure control. The controller 200 causes the shake correction control value calculator 201 to calculate the drive control values of the correction group 6 for performing the shake correction based on these detection results. The correction control values in X-direction and in Y-direction calculated by the shake correction control value calculator 201 are respectively entered into a first driving circuit 213 for correction lens in X-direction and a second driving circuit 214 for correction lens in Y-direction. The first and second driving circuit 213 and 214 respectively drives the first and second piezoelectric devices 12x and 12y (see FIG. 2). Thus, the correction lens group 6 is moved in both of X-direction and Y-direction.

A light metering circuit 221 detects a brightness of the object to be exposed. A focus control circuit 222 detects a condition that the object is focused by the taking lens 101. The controller 200 enters an aperture control values based on the brightness of the object to an aperture control circuit 224 for controlling the aperture 225 provided in the taking lens 101. The controller 200 enters a control values for driving the taking lens 101 to an AF motor control circuit 226. Thus, the position of the taking lens 101 is changed so that the condition of the object sensed by the focus control circuit 222 is changed. Furthermore, the controller 200 enters a control value for controlling a speed of a shutter 229 to a shutter control circuit 228.

A flash firing control circuit 223 controls firing of the flash lamp 102. The flash firing control circuit 223 causes the flash lamp 102 to irradiate a specified amount of light based on a light emission amount entered by the controller 200 at a specified emission timing.

Next, a shake correction photographing control of the camera 100 is described with reference to a flow chart of FIG. 9.

Figure 9:
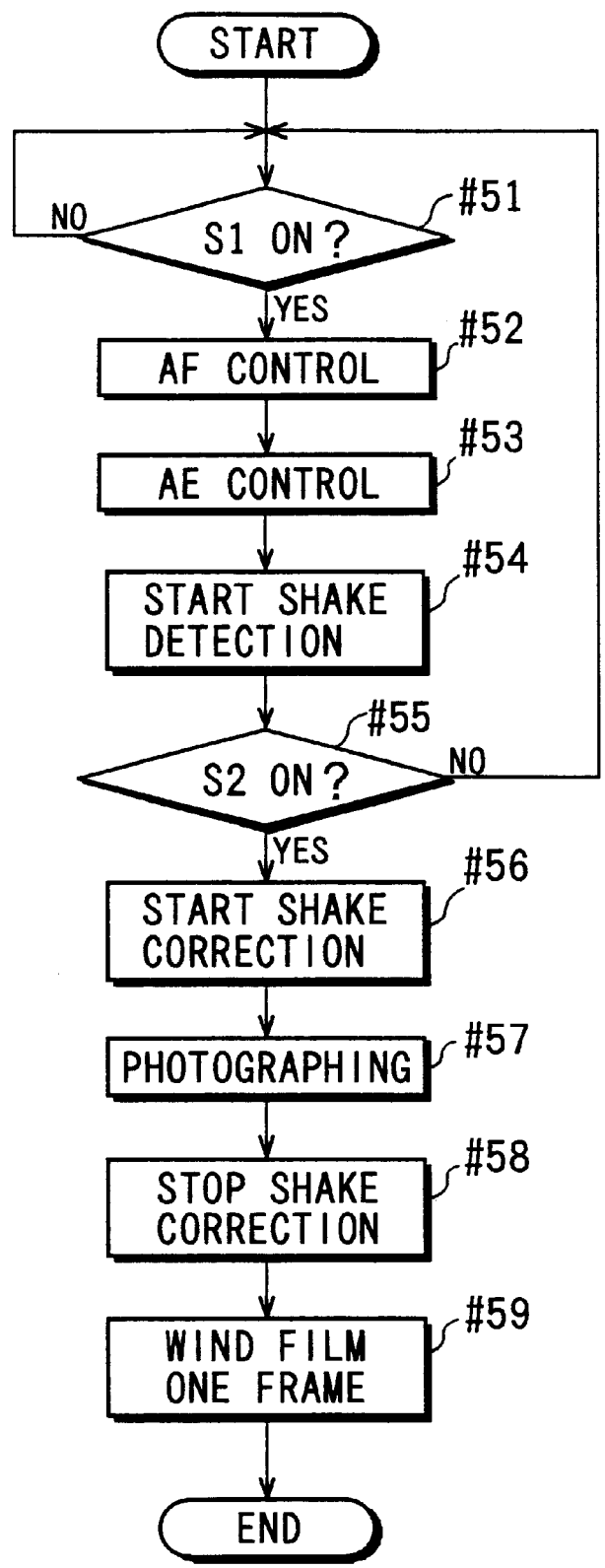
FIG. 9 is a flow chart showing an operation of the camera of the first embodiment.

As can be seen from FIG. 9, in step #51, the controller 200 discriminates whether the shutter release button 104 is partly pressed to turn the switch S1 on. In step #52, when the switch S1 is turned on (YES in step #51), the controller 200 controls the AF motor control circuit 226 and the focus control circuit 222 for positioning the taking lens 101 at a position where the object is just focused on the focal plane of the taking lens 101. In parallel with this operation, in step #53, the brightness of the object is measured by the light metering circuit 221, and the controller calculates the optimum combination of the aperture value and the shutter speed based on the brightness of the object. Furthermore, in step 54, the controller starts to detect the camera shakes in X-direction and in Y-direction by using the accelerometers 4x and 4y.

In step #55, the controller 200 discriminates whether the shutter button 104 is fully operated to turn the switch S2 on. When the switch s2 is turned on (YES in step #55), in step 56, the controller 200 starts to drive the first and second driving circuit 212 and 213 for moving the correction lens group 6 in a manner to cancel or reduce the influence of the camera shake. The movements of the correction lens group 6 in X-direction and in Y-direction are detected by the first and second position sensors 8x and 8y. The error of position detection is corrected by the position detection error corrector 202 in the above-mentioned manner. Thus, the optical axis of the correction lens group 6 is positioned at the most optimum position.

In step #57, while the camera shake has been corrected, the controller 200 controls the aperture control circuit 224 and the shutter control circuit 228 so that the image of the object is exposed on a film. In step #58, when the exposure of the image is completed, the controller 200 stops the shake correction. After that, in step #59, the controller 200 controls a film winding mechanism (not shown in the figure) for winding the film by one frame.

As mentioned above, the camera 100 using the position detecting device monitors the movement of the correction lens group 6 so as to offset the movement of the optical axis of the taking lens 101 due to vibrations of the camera shake. The position of the optical axis of the correction lens group 6 in X-direction corresponds to the position or displacement of the center of the light beam spot emitted from the first light emitting device 17x and passing through the first slit 18x on the light receiving surface 20x of the first PSD 16x deviates in X-direction.

When X-direction is assumed as a position detecting direction and Y-direction and the lengthwise direction of the first slit 18x are deviated from the parallel state due to a tilt of the first slit 18x, the center of the light beam spot on the light receiving surface 20x of the first PSD 16x deviates in X-direction by the movement of the first light emitting device 17x and the first slit 18x in Y-direction. However, the measured position or displacement of the light beam spot on the light receiving surface 20 of the first PSD 16x is corrected by the correction value BK in table 1 corresponding to the position or displacement of the optical axis of the correction lens group 6 in Y-direction. As a result, it is possible to accurately detect the position of the optical axis of the correction lens group 6 and to accurately correct the camera shake.

Second Embodiment

A second embodiment of the present invention is described with reference to FIG. 10. The external appearance and the hardware structure of the second embodiment are substantially the same as that of the above-mentioned first embodiment. The second embodiment performs the correction of position detection using a one-dimensional table similar to the first embodiment. However, the second embodiment is suitable when the PSD elements originally have error component.

In the second embodiment, in order to eliminate the error component of the PSD element and to increase the accuracy of the position detection, the region of Vsa(=V1-V2) [V] is divided into n sections with respect to the detection of the center of the light beam spot emitted from the first light emitting device 17x on the receiving surface 20 of the first PSD 16x in X-direction. In each section of the Vsa, the following linear approximation equation (5) is set. That is, the above-mentioned equation (3) is changed to the following equation (5).

$$x3 = An \times Vsa + Cn \quad (5)$$

Moreover, in order to correct the deviation of the light beam spot emitted from the first light emitting device 17x on the light receiving surface 20x of the first PSD 16x in X-direction due to the displacement Y of them in Y-direction, the following equation (6) is set.

$$x4 = An \times Vsa + Cn + BK \quad (6)$$

Then, an optimum correction value BK corresponding to the displacement Y is selected by the similar way to that of the first embodiment. A corrected displacement x4 is calculated by adding the selected correction value BK to the displacement x3.

Hereupon, parameters An and Cn respectively shown in tables 2 and 3 are applied to respective sections of the region of Vsa. With respect to the correction value BK, the above-mentioned table 1 in the first embodiment is used.

TABLE 2

An-value table

| Vsa | Vsa>1.5 [V] | 1.5≧Vsa≧1 | 1≧Vsa≧0.5 | 0.5>Vsa |
|---|---|---|---|---|
| An | 1.21 | 1.22 | 1.20 | 1.21 |

TABLE 3

Cn-value table

| Vsa | Vsa>1.5 [V] | 1.5≧Vsa≧1 | 1>Vsa≧0.5 | 0.5>Vsa |
|---|---|---|---|---|
| Cn | 0 | 1 | 0 | 2 |

Operations of the second embodiment is described with reference to the flow chart shown in FIG. 10.

As can be seen from FIG. 10, in step #11, the controller 22a measures the input voltages V1 and V2 which correspond to the position of the light beam spot emitted from the first light emitting device 17x on the light receiving surface 20x of the first PSD 16x and calculates Vsa(=V1-V2) using the input voltages V1 and V2. In step #12, the controller 22a detects the displacement Y of the center of the light beam spot emitted from the second light emitting device 17y on the light receiving surface 20y of the second PSD 16y in Y-direction by substantially the same way as that in the above-mentioned step #1 in FIG. 6. In step #13, the controller 22a selects the parameters An value and Cn value respectively from the tables 2 and 3. In step #14, the controller 22a selects the correction value BK from the table 1 using the displacement Y in Y-direction. In step #15, the controller 22a calculates the corrected displacement x4 including the optimum correction value BK in accordance with the equation (6).

In the second embodiment, the linear approximation equation is set for each section of the region of Vsa, so that the error component of the PSD element can be eliminated from the displacement x3 of the light beam spot emitted from the first light emitting device 17x on the light receiving surface 20X of the first PSD 16x in X-direction. Furthermore, the corrected displacement x4 of the light beam spot on the light receiving surface 20x of the first PSD 16x is calculated by adding the correction value BK, which is obtained by using the position or displacement Y of the light beam spot in Y-direction, to the above-mentioned measured position or displacement x3. Thus, the accuracy of the position detection can be increased.

Third Embodiment

A third embodiment of the present invention is described with reference to FIG. 11. The external appearance and the hardware structure of the second embodiment are substantially the same as that of the above-mentioned first embodiment. The third embodiment performs the correction of position detection using a two-dimensional table for two parameters by putting the Cn values and correction values BK in the above-mentioned first and second embodiments. In the third embodiment, though the table size increases, finer correction can be performed.

The above-mentioned equation (3) in the first embodiment is changed to the following equation (7).

$$x5 = An \times vsa + CKn \quad (7)$$

With respect to the detection of the displacement x5 of the center of the light beam spot emitted from the first emitting device 17x on the light receiving surface 20x of the first PSD 16x in X-direction, the region of Vsa(=V1-V2) is divided into n sections. Furthermore, with respect to the detection of the displacement Y of the center of the light beam spot emitted from the second emitting device 17y on the light receiving surface 20y of the second PSD 16y in Y-direction, the region of the displacement Y is divided into k sections. That is, k values of the correction value are provided for respective section of the region of the displacement Y.

Hereupon, correction values of Ckn (Ckn=Cn+BK) shown in table 4 are applied to respective sections of the region of Y and the region of Vsa. With respect to the parameter An, the above-mentioned table 2 in the second embodiment is used.

TABLE 4

Ckn value table

|  | Vsa>1.5 [V] | 1.5≧Vsa≧1 | 1>Vsa≧0.5 | 0.5>Vsa |
|---|---|---|---|---|
| Y>0.5 [mm] | 4 | 6 | 5 | 5 |
| 0.5≧Y≧−0.5 | 0 | 1 | 0 | 1 |
| −0.5>Y | −5 | −4 | −5 | −3 |

Operations of the third embodiment is described with reference to the flow chart shown in FIG. 11.

As can be seen from FIG. 11, in step #21, the controller 22b measures the input voltages V1 and V2 which correspond to the position of the light beam spot emitted from the first light emitting device 17x on the light receiving surface 20x of the first PSD 16x and calculates Vsa(=V1-V2) using the input voltages V1 and V2. In step #22, the controller 22a detects the displacement Y of the center of the light beam spot emitted from the second light emitting device 17y on the light receiving surface 20y of the second PSD 16y in Y-direction by substantially the same way as that in the above-mentioned step #1 in FIG. 6. In step #23, the controller 22b selects the parameter An value from the tables 2 in the second embodiment using the Vsa. In step #24, the controller 22b selects the correction value Ckn from the table 4 using the Vsa. In step #25, the controller 22b calculates the corrected displacement x5 in accordance with the equation (7).

Other Embodiments

In the above-mentioned first and second embodiments, the following equations (4) and (6) are set.

$$x2 = A \times Vsa + BK \quad (4)$$

$$x4 = An \times Vsa + Cn + BK \quad (6)$$

However, it is possible to substitute the equations (4) and (6) for the following equations (8) and (9).

$$x8 = (A \times Vsa) \times BK1 \quad (8)$$

$$x9 = (An \times Vsa + Cn) \times BK2 \quad (9)$$

BK1 and BK2 denote correction rates.

In the second and third embodiments, the parameter An which is changed in each section corresponding to the value of Vsa(=V1-V2). However, it is possible to use the following equations (10) and (11) by keeping the An value constant.

$$x10 = A \times Vsa + Cn + BK \quad (10)$$

$$x11 = A \times Vsa + CKn \quad (11)$$

The apparatus described in the above-mentioned embodiments is the still camera using a film. However, the apparatus of this invention can be used in, for example, a movie camera, a video movie camera, a digital camera, a binocular telescope, an image projector, and so on.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:

a first light emitting device and a first light receiving device provided relatively movable in a first direction, said first light emitting device emitting a light beam on a light receiving surface of said first light receiving device, and said first light receiving device outputting at least a signal corresponding to a position of said light beam;

a second light emitting device and a second light receiving device provided relatively movable in a second direction, said second light emitting device emitting a light beam on a light receiving surface of said second light receiving device, and said second light receiving device outputting at least a signal corresponding to a position of said light beam; and a correction controller correcting an error component in a first result of position detection in said first direction by using a second result of a position detection in said second direction.

2. The apparatus in accordance with claim 1, wherein said correction controller corrects the error component in said first result by adding a correction vale to said first result of position detection, and selects said correction value from a first one dimensional table corresponding to the second result of position detection.

3. The apparatus in accordance with claim 2, wherein said correction controller selects two parameters respectively from a second and a third one dimensional tables corresponding to said first result of position detection, and further corrects said first position detection by using said two parameters for canceling an inherent error component of said first light receiving device.

4. The apparatus in accordance with claim 1, wherein said correction controller selects a parameter from a second one dimensional table corresponding to said first result of position detection and a correction value from a fourth two dimensional table corresponding to said first and second results of position detection for canceling inherent error components of said first and second light receiving devices.

5. An apparatus comprising:

a first driving mechanism for moving a moving object to be moved in a first direction;

a second driving mechanism for moving said moving object in a second direction;

a first position sensor for detecting a position of said moving member in said first direction;

a second position sensor for detecting a position of said moving member in said second direction; and an error corrector for correcting an error component of a first result of position detection in said first direction by said first position sensor based on a second result of position detection in said second direction by said second position sensor.

6. The apparatus in accordance with claim 5, wherein:

said moving object is a lens held on a first moving frame which is movably held in the alternative of said first and second directions by a second moving frame, said second moving frame is movably held in the other direction by a fixed frame;

said first position sensor comprises a first light emitting device and a first light receiving device provided relatively movable in a first direction, said first light emitting device emitting a light beam on a light receiving surface of said first light receiving device, and said first light receiving device outputting at least a signal corresponding to a position of said light beam;

said second position sensor a second light emitting device and a second light receiving device provided relatively movable in a second direction, said second light emitting device emitting a light beam on a light receiving surface of said second light receiving device, and said second light receiving device outputting at least a signal corresponding to a position of said light beam;

the alternative of said first light emitting device and said first light receiving device and the alternative of said second light emitting device and said second light receiving device are provided on said first moving frame and the others are provided on said fixed frame; and the alternative of said first moving frame and said fixed frame comprises slits for narrowing light beams emitted from said first and second light emitting devices.

7. The apparatus in accordance with claim 6, wherein:

said second position sensor detects a deviation of a center of said light beam emitted from said first light emitting device and passing through said slit on said light receiving surface of said first light receiving device due to a movement of said first light emitting device in said second direction; and said error corrector corrects said first result of position detection based on said deviation.

8. An apparatus comprising:

a first driving mechanism for moving a moving object to be moved in a first direction;

a second driving mechanism for moving said moving object in a second direction;

a first position sensor for detecting a position of said moving member in said first direction;

a second position sensor for detecting a position of said moving member in said second direction; and an error detector for detecting an error component of said first position sensor due to a movement of said moving object in said second direction.

9. The apparatus in accordance with claim 8, wherein said error detector detects the error component of said first position sensor based on an output of said second position sensor.

10. The apparatus in accordance with claim 9, wherein:

said moving object is a lens held on a first moving frame which is movably held in the alternative of said first and second directions by a second moving frame, said second moving frame is movably held in the other direction by a fixed frame;

said first position sensor comprises a first light emitting device and a first light receiving device provided relatively movable in a first direction, said first light emitting device emitting a light beam on a light receiving surface of said first light receiving device, and said first light receiving device outputting at least a signal corresponding to a position of said light beam;

said second position sensor a second light emitting device and a second light receiving device provided relatively movable in a second direction, said second light emitting device emitting a light beam on a light receiving surface of said second light receiving device, and said second light receiving device outputting at least a signal corresponding to a position of said light beam;

the alternative of said first light emitting device and said first light receiving device and the alternative of said second light emitting device and said second light receiving device are provided on said first moving frame and the others are provided on said fixed frame; and the alternative of said first moving frame and said fixed frame comprises slits for narrowing light beams emitted from said first and second light emitting devices.

11. The apparatus in accordance with claim 10, wherein:

said second position sensor detects a deviation of a center of said light beam emitted from said first light emitting device and passing through said slit on said light receiving surface of said first light receiving device due to a movement of said first light emitting device in said second direction; and said error corrector corrects said first result of position detection based on said deviation.

12. An apparatus comprising:

a first driving mechanism for moving a shake correction lens in a first direction;

a second driving mechanism for moving said shake correction lens in a second direction;

a first position sensor for detecting a position of said shake correction lens in said first direction;

a second position sensor for detecting a position of said shake correction lens in said second direction;

an error corrector for correcting an error component of a first result of position detection in said first direction by said first position sensor based on a second result of position detection in said second direction by said second position sensor; and a controller for controlling said first driving mechanism based on the corrected first result of position detection by said error corrector.

13. The apparatus in accordance with claim 12, wherein said apparatus is a camera.

14. The apparatus in accordance with claim 12, wherein:

said shake correction lens is held on a first moving frame which is movably held in the alternative of said first and second directions by a second moving frame, said second moving frame is movably held in the other direction by a fixed frame;

said first position sensor comprises a first light emitting device and a first light receiving device provided relatively movable in a first direction, said first light emitting device emitting a light beam on a light receiving surface of said first light receiving device, and said first light receiving device outputting at least a signal corresponding to a position of said light beam;

said second position sensor a second light emitting device and a second light receiving device provided relatively movable in a second direction, said second light emitting device emitting a light beam on a light receiving surface of said second light receiving device, and said second light receiving device outputting at least a signal corresponding to a position of said light beam;

the alternative of said first light emitting device and said first light receiving device and the alternative of said second light emitting device and said second light receiving device are provided on said first moving frame and the others are provided on said fixed frame; and the alternative of said first moving frame and said fixed frame comprises slits for narrowing light beams emitted from said first and second light emitting devices.

15. The apparatus in accordance with claim 14, wherein said apparatus is a camera.

16. The apparatus in accordance with claim 15, wherein:

said second position sensor detects a deviation of a center of said light beam emitted from said first light emitting device and passing through said slit on said light receiving surface of said first light receiving device due to a movement of said first light emitting device in said second direction; and said error corrector corrects said first result of position detection based on said deviation.

17. The apparatus in accordance with claim 16, wherein said apparatus is a camera.

18. An apparatus comprising:

a first driving mechanism for moving a shake correction lens in a first direction;

a second driving mechanism for moving said shake correction lens in a second direction;

a first position sensor for detecting a position of said shake correction lens in said first direction;

a second position sensor for detecting a position of said shake correction lens in said second direction;

an error detector for detecting an error component of said first position sensor due to a movement of said moving object in said second direction;

an error corrector for correcting the error component of said first position sensor detected by said error detector; and a controller for controlling said first driving mechanism based on the corrected first result of position detection by said error corrector.

19. The apparatus in accordance with claim 18, wherein said apparatus is a camera.

20. The apparatus in accordance with claim 18, wherein:

said second position sensor detects a deviation of a center of said light beam emitted from said first light emitting device and passing through said slit on said light receiving surface of said first light receiving device due to a movement of said first light emitting device in said second direction; and said error corrector corrects said first result of position detection based on said deviation.

21. The apparatus in accordance with claim 20, wherein said apparatus is a camera.

22. The apparatus in accordance with claim 20, wherein:

said shake correction lens is held on a first moving frame which is movably held in the alternative of said first and second directions by a second moving frame, said second moving frame is movably held in the other direction by a fixed frame;

said first position sensor comprises a first light emitting device and a first light receiving device provided relatively movable in a first direction, said first light emitting device emitting a light beam on a light receiving surface of said first light receiving device, and said first light receiving device outputting at least a signal corresponding to a position of said light beam;

said second position sensor a second light emitting device and a second light receiving device provided relatively movable in a second direction, said second light emitting device emitting a light beam on a light receiving surface of said second light receiving device, and said second light receiving device outputting at least a signal corresponding to a position of said light beam;

the alternative of said first light emitting device and said first light receiving device and the alternative of said second light emitting device and said second light receiving device are provided on said first moving frame and the others are provided on said fixed frame; and the alternative of said first moving frame and said fixed frame comprises slits for narrowing light beams emitted from said first and second light emitting devices.

23. The apparatus in accordance with claim 22, wherein said apparatus is a camera.

24. The apparatus in accordance with claim 22, wherein:

said second position sensor detects a deviation of a center of said light beam emitted from said first light emitting device and passing through said slit on said light receiving surface of said first light receiving device due to a movement of said first light emitting device in said second direction; and said error corrector corrects said first result of position detection based on said deviation.

25. The in accordance with one of claim 24, wherein said apparatus is a camera.

* * * * *